(12) United States Patent
Min et al.

(10) Patent No.: US 12,498,527 B2
(45) Date of Patent: Dec. 16, 2025

(54) PACKAGING MICROLED OPTICAL INTERCONNECTS

(71) Applicant: AvicenaTech Corp., Sunnyvale, CA (US)

(72) Inventors: Sunghwan Min, Sunnyvale, CA (US); Robert Kalman, Sunnyvale, CA (US); Bardia Pezeshki, Sunnyvale, CA (US); Alexander Tselikov, Sunnyvale, CA (US)

(73) Assignee: AvicenaTech, Corp., Sunnyvale, CA (US)

( * ) Notice: Subject to any disclaimer, the term of this patent is extended or adjusted under 35 U.S.C. 154(b) by 263 days.

(21) Appl. No.: 18/110,154

(22) Filed: Feb. 15, 2023

(65) Prior Publication Data

US 2023/0258888 A1 Aug. 17, 2023

Related U.S. Application Data

(60) Provisional application No. 63/268,061, filed on Feb. 15, 2022.

(51) Int. Cl.
*G02B 6/42* (2006.01)
(52) U.S. Cl.
CPC ......... *G02B 6/4246* (2013.01); *G02B 6/4228* (2013.01); *G02B 6/4269* (2013.01); *G02B 6/428* (2013.01); *G02B 6/4214* (2013.01); *G02B 6/423* (2013.01)

(58) Field of Classification Search
CPC .. G02B 6/4246; G02B 6/4228; G02B 6/4269; G02B 6/428; G02B 6/4214
See application file for complete search history.

(56) References Cited

U.S. PATENT DOCUMENTS

| | | | | |
|---|---|---|---|---|
| 7,192,200 | B2 * | 3/2007 | Casati | G02B 6/4204 385/92 |
| 9,088,128 | B2 * | 7/2015 | Kasai | H01S 5/02251 |
| 10,333,623 | B1 * | 6/2019 | Liao | H10H 20/857 |
| 12,029,004 | B2 * | 7/2024 | Winzer | H05K 1/141 |
| 2004/0008952 | A1 * | 1/2004 | Kragl | C25D 1/10 257/E33.071 |
| 2012/0138961 | A1 | 6/2012 | Huang et al. | |

(Continued)

FOREIGN PATENT DOCUMENTS

JP 2007-108542 A 4/2007

OTHER PUBLICATIONS

International Search Report by International Searching Authority (KIPO) in related PCT Application No. PCT/US2023/013131 dated Jun. 12, 2023.

(Continued)

*Primary Examiner* — Michelle R Connelly
*Assistant Examiner* — Marc E Manheim (57) ABSTRACT

A packaging and assembly of a parallel optical link is disclosed. The packaging and assembly may have four major parts: assembly of the optical transceiver die, 2.5D package assembly, package attachment to a system printed circuit board, and optical coupling attachment. A frame and a removable lid may be attached to the optical transceiver die. The lid may protect the optical transceiver array of the optical transceiver die, and the frame may help in aligning optical coupling assembly with the optical transceiver array.

12 Claims, 7 Drawing Sheets

(56) References Cited

U.S. PATENT DOCUMENTS

| | | |
|---|---|---|
| 2018/0100977 A1 | 4/2018 | Lee |
| 2021/0091056 A1 | 3/2021 | Yu et al. |
| 2021/0104812 A1 | 4/2021 | Kapusta et al. |
| 2023/0092821 A1* | 3/2023 | Karhade ............ G02B 6/3897 385/14 |
| 2023/0204879 A1* | 6/2023 | Kim ................... G02B 6/4249 385/33 |

OTHER PUBLICATIONS

Written Opinion by International Searching Authority (KIPO) in related PCT Application No. PCT/US2023/013131 dated Jun. 12, 2023.

* cited by examiner

PACKAGING MICROLED OPTICAL INTERCONNECTS

CROSS-REFERENCE TO RELATED APPLICATIONS

This application claims the benefit of U.S. Provisional Patent Application No. 63/268,061, filed on Feb. 15, 2022, the disclosure of which is incorporated by reference herein.

FIELD OF INVENTION

The present invention is related generally to optical interconnects using microLEDs, and more particularly to packaging microLED optical interconnects.

BACKGROUND OF THE INVENTION

Computing and networking performance requirements are seemingly ever-increasing. Prominent applications driving these requirements include data center servers, high-performance computing clusters, artificial neural networks, and network switches.

For decades, dramatic integrated circuit (IC) performance and cost improvements were driven by shrinking transistor dimensions combined with increasing die sizes, summarized in the famous Moore's Law. Transistor counts in the billions have allowed consolidation onto a single system-on-a-chip (SoC) of functionality that was previously fragmented across multiple ICs. However, Moore's Law appears to be reaching its limits as shrinking feature sizes below 10 nm results in decreasing marginal performance benefits with decreased yields and increased per-transistor costs.

Beyond these limitations, a single IC can only contain so much functionality, and that functionality is constrained because the IC's process cannot be simultaneously optimized for different functionality, e.g., logic, DRAM, and I/O. Increasingly, improving system performance is dependent on implementing very high bandwidth interconnects between multiple ICs.

Unfortunately, compared to the on-chip connections, today's chip-to-chip connections are typically much less dense and require far more power (for example normalized as energy per bit). These inter-IC connections are currently significantly limiting system performance. Specifically, the power, density, latency, and distance limitations of interconnects are far from what is desired.

New interconnect technologies that provide significant improvements in multiple performance aspects are highly desirable. It is well-known that optical interconnects may have fundamental advantages over electrical interconnects, even for relatively short interconnects of <<1 meter. Parallel optical interconnects, in particular, are promising for these applications. Practical parallel optical interconnects preferably integrate with other ICs using relatively standard packaging processes.

BRIEF SUMMARY OF INVENTION

Some embodiments provide a parallel optical link packaging assembly, comprising: an optical transceiver die having an integrated circuit wafer with a plurality of through-silicon vias connecting an optoelectronic device array attached on a top surface of the integrated circuit wafer to a bottom surface of the integrated circuit wafer; the optoelectronic device array having a plurality of microLEDs and a plurality of photodetectors; and a frame with a removable lid, the frame attached to the top surface of the integrated circuit wafer, the frame having apertures configured to align one or more optical coupling components with the optoelectronic device array.

In some embodiments, the one or more optical coupling components are configured to optically connect the optoelectronic device array with another optical transceiver die. In some embodiments, the one or more optical coupling components comprise a multicore optical fiber that is insertable inside one of the apertures of the frame. In some embodiments, the apertures of the frame have vertical steps configured to align the multicore optical fiber with the optoelectronic device array. In some embodiments, the one or more optical coupling components comprise a first part having a first lens and a mirror and a second part having a second lens and a multicore optical fiber. In some embodiments, the first part is attachable on top of the frame.

In some embodiments of parallel optical link packaging assembly, the optical transceiver die along with the frame and the removable lid are encased in a molding compound. In some embodiments, the removable lid is partially removable. In some embodiments, the removable lid is configured to be removed by mechanical grinding. In some embodiments, the removable lid has one or more bridges near the apertures of the frame.

In some embodiments of the parallel optical link packaging assembly, the optical transceiver die is attached to an interposer having a digital logic die using a 2.5D packaging process. In some embodiments, the interposer having the optical transceiver die and the digital logic die is attached to a package substrate using the 2.5D packaging process. In some embodiments, the package substrate is attached to a printed circuit board. In some embodiments, the parallel optical link packaging assembly further comprises a heat sink.

Some embodiments provide a method of manufacturing a parallel optical link packaging assembly, comprising: providing an integrated circuit wafer; fabricating through-silicon vias in the integrated circuit wafer, the through-silicon vias connecting a top surface of the integrated circuit wafer to a bottom surface of said integrated circuit wafer; attaching an optoelectronic device array on the top surface of the integrated circuit wafer, said optoelectronic device array having a plurality of microLEDs and a plurality of photodetectors; and attaching a frame with a removable lid on the top surface of the integrated circuit wafer, the frame having apertures configured to align one or more optical coupling components with the optoelectronic device array.

In some embodiments, the one or more optical coupling components comprise of a multicore optical fiber that is inserted inside one of the apertures of the frame. In some embodiments, the apertures of the frame have vertical steps that align the multicore optical fiber with the optoelectronic device array. In some embodiments, the method further comprises encasing the parallel optical link packaging assembly in a molding compound. In some embodiments, the method comprises at least partially removing the removable lid and a portion of the molding compound on the removable lid by mechanical grinding. In some embodiments, the removable lid has one or more bridges near the apertures of the frame.

These and other aspects of the invention are more fully comprehended upon review of this disclosure.

DETAILED DESCRIPTION

Figure 1A:
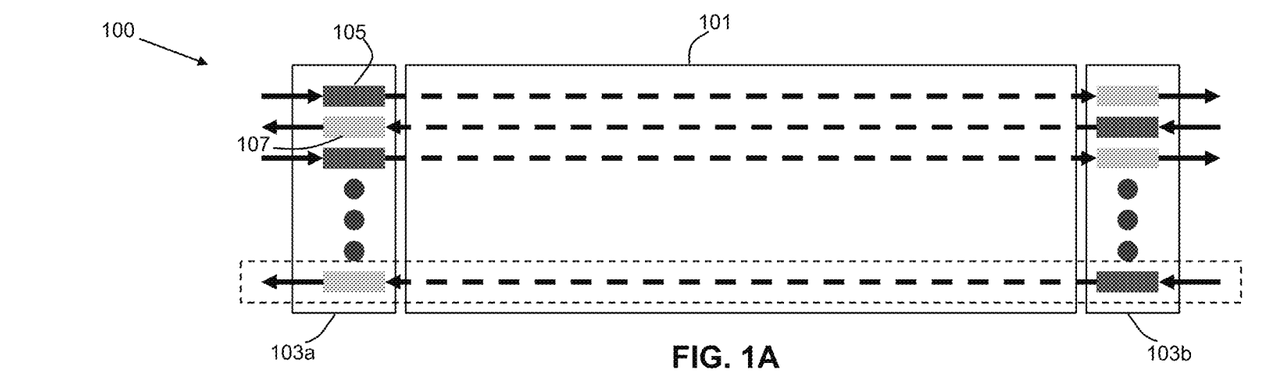
FIG. 1A is a block diagram of one embodiment of a parallel optical interconnect, in accordance with aspects of the invention.
Figure 1B:
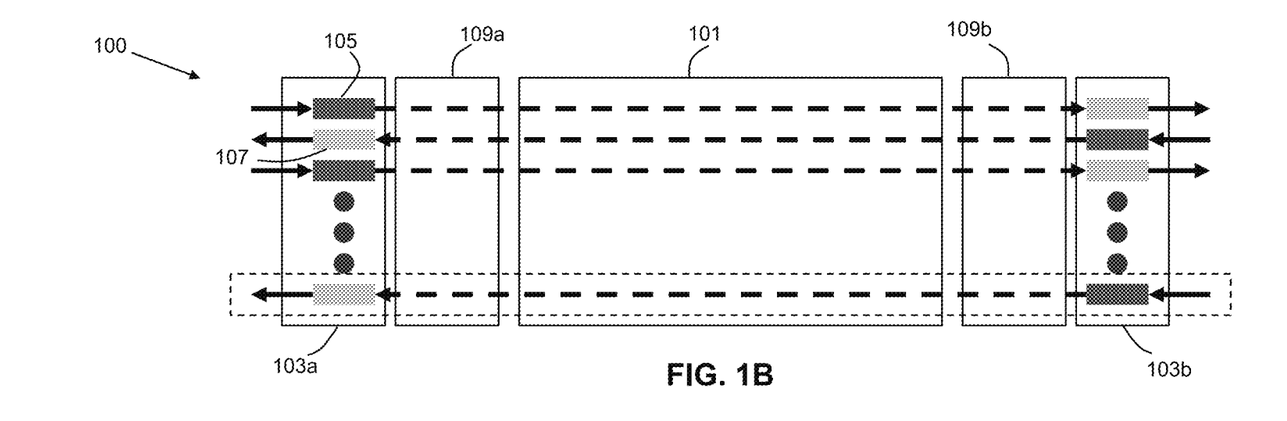
FIG. 1B is a block diagram of another embodiment of a parallel optical interconnect, in accordance with aspects of the invention.

FIG. 1A is a block diagram of one embodiment of a parallel optical interconnect 100. Specifically, the block diagram of the parallel optical interconnect shows the usage of a multicore optical fiber 101. In some embodiments of a parallel optical interconnect, a first optical transceiver array 103a is coupled to a first end of the multicore optical fiber and a second optical transceiver array 103b is coupled to a second end of the multicore optical fiber. An optical transceiver array comprises a one or more optical transmitters 105 and/or optical receivers 107. In some embodiments, the optical transceiver array comprises an optoelectronic device array, which may comprise a mix of microLEDs and photodetectors. FIG. 1B is a block diagram of another embodiment of a parallel optical interconnect. In some embodiments of a parallel optical interconnect, an optical coupling assembly 109a-b is interposed between each optical transceiver array and the multicore optical fiber. The optical coupling assembly may comprise one or more lenses, mirrors, or other optical components.

In some embodiments of a parallel optical interconnect, emitters of one optical transceiver array are paired with photodetectors of another optical transceiver array. In some embodiments, there is a one-to-many correspondence between fiber cores and emitter/photodetector pairs. In some embodiments there is a one-to-one correspondence between fiber cores and emitter/photodetector pairs.

In some embodiments, a microLED is made from a p-n junction of a direct-bandgap semiconductor material. In some embodiments, a microLED is distinguished from a semiconductor laser (SL) as follows: (1) a microLED does not have an optical resonator structure; (2) the optical output from a microLED is almost completely spontaneous emission, whereas the output from a SL is dominantly stimulated emission; (3) the optical output from a microLED is temporally and spatially incoherent, whereas the output from a SL has significant temporal and spatial coherence; (4) a microLED is designed to be driven down to a zero minimum current, whereas a SL is designed to be driven down to a minimum threshold current, which is typically at least 1 mA. In some embodiments, a microLED is distinguished from a standard LED by (1) having an emitting region of less than 10 μm×10 μm; (2) frequently having cathode and anode contacts on top and bottom surfaces, whereas a standard LED typically has both positive and negative contacts on a single surface; (3) typically being used in large arrays for display and interconnect applications.

Figure 2A:
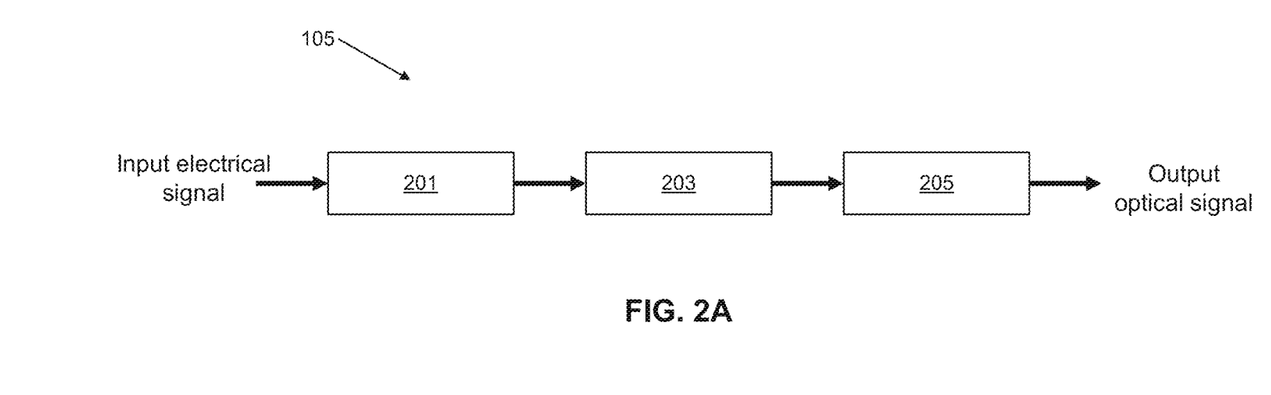
FIG. 2A is a block diagram of an optical transmitter, in accordance with aspects of the invention.

FIG. 2A is a block diagram of an optical transmitter 105. In some embodiments, an optical transmitter comprises a microLED drive circuit 201. The drive circuit is to receive an input electrical signal and drive a microLED 203. The microLED may output an optical signal modulated by the input electrical signal. In some set of embodiments, the drive circuit comprises equalization circuitry that increases the maximum data rate supported by the transmitter. In a set of embodiments, the electrical and optical signals utilize non-return-to-zero (NRZ) modulation. In other embodiments, other modulation formats may be used, such as PAM-N and N-QAM, where N is a power of two. In some embodiments, an optical transmitter comprises LED collector optics 205 that enable improved optical coupling efficiency to the multicore optical fiber. In some embodiments, the collector optics may comprise an encapsulant layer, lenses, flat mirrors, and/or curved mirrors.

Figure 2B:
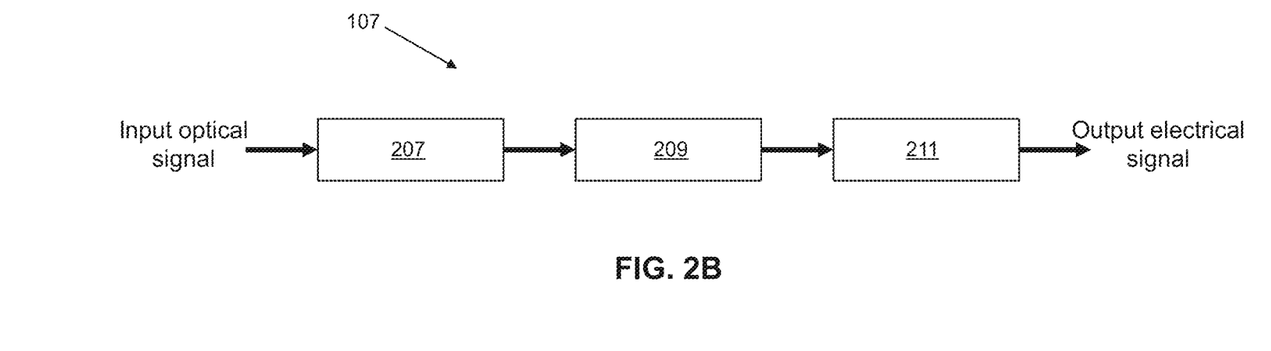
FIG. 2B is a block diagram of an optical receiver, in accordance with aspects of the invention.

FIG. 2B is a block diagram of an optical receiver 107. The receiver comprises one or more photodetectors 209 and receiver electronics 211. In a set of embodiments, the receiver also includes collector optics 207 placed in front of each photodetector that increase the optical coupling efficiency from the multicore optical fiber to the photodetectors. The collector optics may comprise one or more refractive, reflective, and/or spatial filtering elements. In a set of embodiments, a receiver contains one photodetector. In another set of embodiments, a receiver contains more than one photodetector. Each photodetector converts an input optical signal to an output electrical signal. The electrical output signals from the photodetector or photodetectors are connected to the receiver circuit that amplifies the signal. In some embodiments, the receiver circuit also comprises an equalizer, a decision circuit, a limiting amplifier, and/or buffer amplifiers.

In some sets of embodiments, the microLEDs in an optoelectronic device array are attached to a single substrate. In some embodiments, this substrate is a silicon integrated circuit (IC) comprising transmitter circuitry. In some embodiments, this same IC comprises receiver circuitry. In some embodiments, this same IC comprises photodiodes.

In some sets of embodiments, all of the photodetectors in the array are mounted to a single substrate. The substrate may be made from various materials including sapphire, silicon, glass, ceramic, or the same semiconductor material as the photodetector, e.g. Si, Ge, or InGaAs. In some sets of embodiments, the circuitry for some or all of the receivers are integrated onto a common IC. In some sets of embodiments, the photodetectors are monolithically integrated with the receiver circuits. This is especially useful for materials in which high-performance, high-density, low-cost electronics are available such as silicon.

Figures 3A, 3B, 3F:
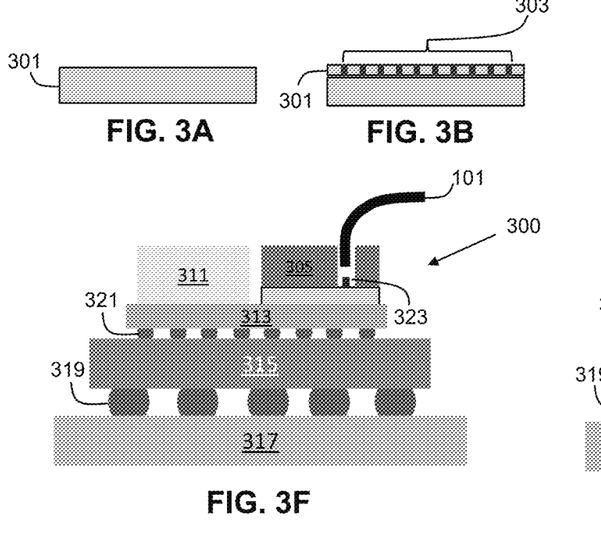
FIGS. 3A-F show components in a packaging and assembly process for a parallel optical link, in accordance with aspects of the invention.
Figures 3C, 3D, 3E:
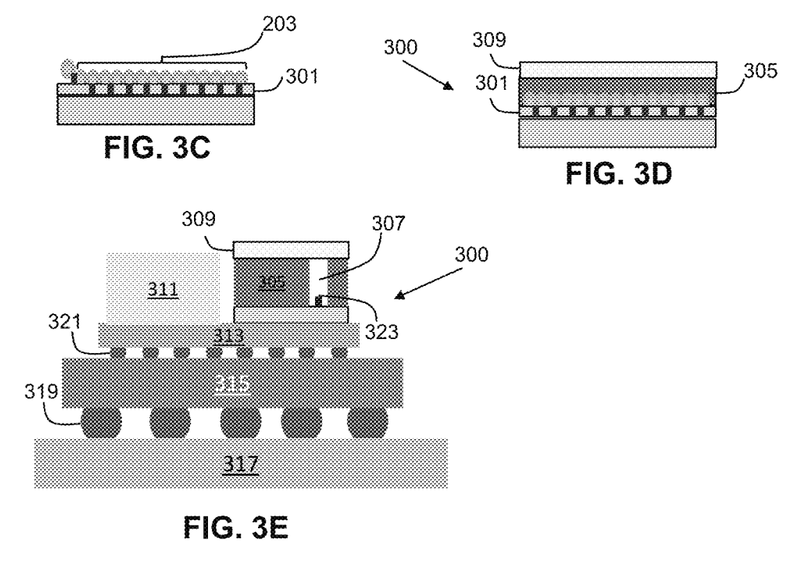
Figure 3G:
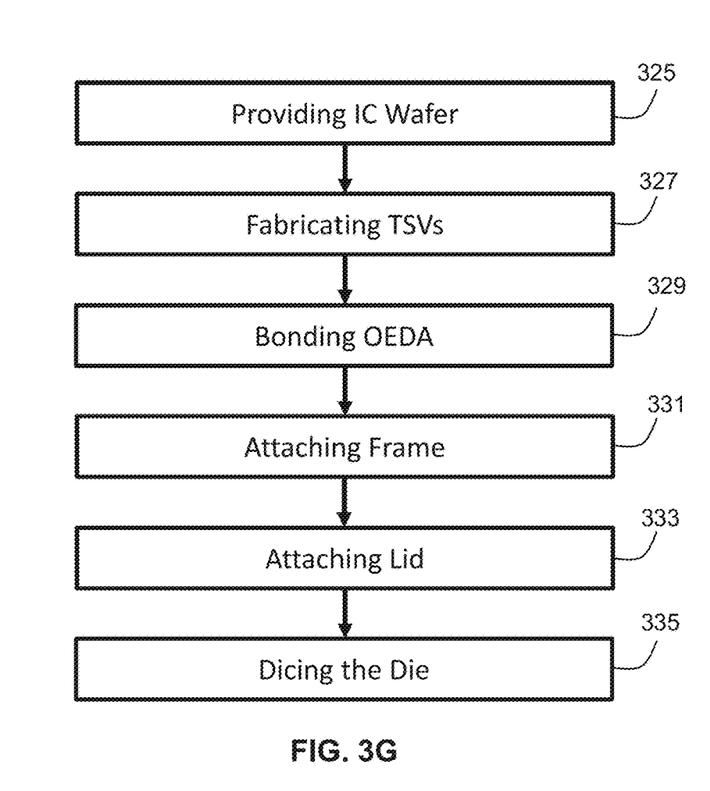
FIG. 3G is a flow chart of part of a packaging and assembly shown in FIGS. 3A-D, in accordance with aspects of the invention.
Figure 3H:
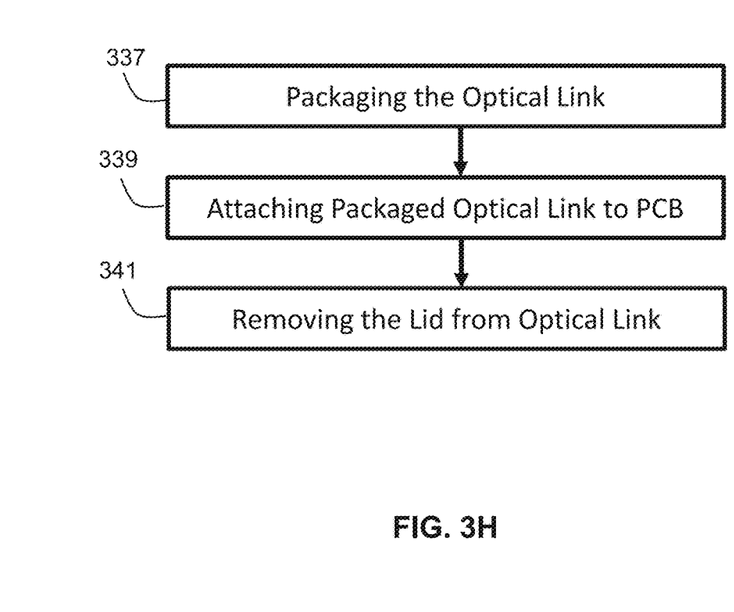
FIG. 3H is a flow chart of part of a packaging and assembly shown in FIGS. 3E-F, in accordance with aspects of the invention.

FIGS. 3A-F show components in a packaging and assembly process for a parallel optical link, and FIGS. 3G-H are the accompanying flow charts of the packaging and assembly process. The packaging process is comprised of four major parts: assembly of the optical transceiver die 300, 2.5D package assembly, package attachment to a system printed circuit board, and fiber attachment.

In block 325 of the process, an IC wafer is provided. In some embodiments, assembly of optical transceiver die begins with an IC wafer 301 comprising silicon IC circuitry, as shown in FIG. 3A. In some embodiments, in block 327 of the process, through-silicon vias 303 (TSVs) are fabricated in the IC wafer. In some embodiments the TSVs extend through the IC wafer from one side to an opposing side; in some embodiments, and as shown in FIG. 3B, the TSVs extend to a metal layer in the wafer. The through-silicon vias provide electrical connectivity from the "top" IC surface containing active circuitry to the opposite "bottom" IC surface. In block 329 of the process, microLEDs are bonded to the IC wafer. In some embodiments photodetectors are also bonded to the IC wafer in block 329, although in some embodiments the photodetectors are instead formed in the IC wafer. The microLEDs and/or the photodetectors may be considered to form an optoelectronic device array (OEDA). In some embodiments a plurality of microLEDs 203 are bonded to the IC wafer in designated bonding positions on the top IC surface by using solder bonding or metal-metal bonding, as shown in FIG. 3C. In some embodiments, the microLEDs are attached to the IC wafer in arrays arranged on a regular grid, where the grid may, for instance, be a square or hexagonal close packed (HCP) grid. In some embodiments, the center-to-center spacing of the microLEDs in each array is in the range of 30 um to 70 um. In some embodiments, the center-to-center spacing of the microLEDs in each array is less than 30 um. In some embodiments, the center-to-center spacing of the microLEDs in each array is greater than 70 um.

An optomechanical frame is attached to the IC wafer in block 331 of the process. In some embodiments, and as shown in FIG. 3D, the optomechanical "frame" 305 is attached to a top surface of the IC wafer 301 having the microLEDs, as shown in FIG. 3D. The purpose of the frame is to position and hold optical components to which the optoelectronic device array elements are optically coupled. As discussed elsewhere herein, the optoelectronic device array may comprise of microLEDs and photodetectors. In some embodiments, the optical coupling components comprise optical fibers 101 such as multicore optical fibers. In some embodiments, these optical coupling components comprise an optomechanical coupling assembly comprising some combination of lenses, mirrors, and optical fibers.

Figure 4A:
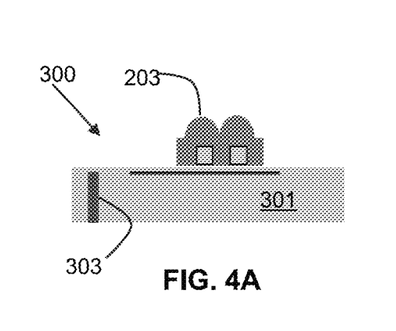
FIGS. 4A-E show a close-up view of the packaging and assembly process for a parallel optical link and also implementing a molding compound around optical transceiver die, in accordance with aspects of the invention.
Figure 4B:
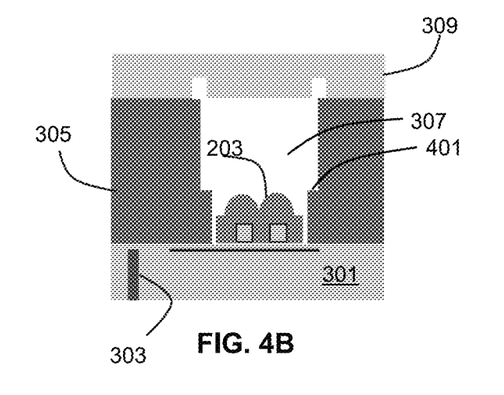

In some embodiments, the frame comprises apertures 307, each of which is precisely aligned with an optoelectronic device array 323, as shown in FIG. 3E. In some embodiments, optical coupling components that are inserted into frame apertures (in later assembly process steps) are positioned with sufficient accuracy relative to an optoelectronic device array that there is no need for subsequent alignment operations on those components. As shown in FIG. 3F, such optical coupling components may comprise of optical fibers 101. In some embodiments, each aperture has features such as vertical steps 401 (see FIG. 4B) that accurately position the various optical components (e.g. fiber, lenses) in the "vertical" dimension (normal to the IC wafer surface). In some embodiments, each aperture may comprise features designed to support adhesive attachment to the frame of the various optical components.

In some embodiments, the frame is attached to the IC wafer using an adhesive. In some embodiments, the frame is positioned on the IC wafer using fiducial marks on the IC wafer and/or on the frame.

In some embodiments, the frame is comprised of silicon. In some embodiments, the frame is comprised of glass or metal. In some embodiments, the frame is comprised of polymer and may be deposited on the wafer and lithographically processed, or may be fabricated separately and then attached to the IC wafer.

In block 333 of the process, a lid is attached to the frame. In some embodiments, a lid 309 is attached to the top of the frame, as shown in FIG. 3D. The lid may protect the underlying components from contamination during subsequent processing and handling. The lid may be comprised of silicon, glass, or some other material. In block 335 of the process, the wafer assembly is diced. In some embodiments each die comprises one or more optoelectronic device arrays, each aligned with a frame aperture. Each die may be referred to as an optical transceiver die 300.

In block 337 of the process, the optical transceiver die are packaged. In some embodiments, the optical transceiver die are packaged using any number of 2.5D packaging techniques that are used with "standard" IC dies. This may include packaging with various interposer technologies that allow the optical transceiver die to be electrically interconnected to other die that contain, for instance, digital logic 311, for example as shown in FIG. 3E. The digital logic die may be electrically interconnected to the optical transceiver die via an underlying silicon interposer 313.

The frame/lid structure on the optical transceiver die 300 may protect the underlying optoelectronic components from contamination and damage during 2.5D package processing. In some embodiments, optical transceiver die (including the frame/lid and solder bumps on its bottom) are encased in molding compound. In block 339 of the process, the packaged items are attached to a printed circuit board. For example, after the 2.5D packaging process, the package substrate 315 having the optical transceiver die interconnected to the digital logic die, via the interposer, may be attached to a system printed circuit board 317, for example as shown in FIG. 3E. Such attachment may be done using a first set of solder bumps 319. The package substrate may be attached to the interposer having the optical transceiver die and digital logic die using a second set of solder bumps 321.

In some embodiments, the final part of the assembly process enables attachment of optical fibers 101 to the package assembly, as shown in FIG. 3F. In block 341 of the process, the lid is removed from the top of the frame. Alternatively, the top of the frame may be removed. The lid may be removed from the top of the frame such that optical fibers may be placed within the aperture and align with one or more optoelectronic devices of the optoelectronic device arrays 323, as shown in FIG. 3F.

Figure 4C:
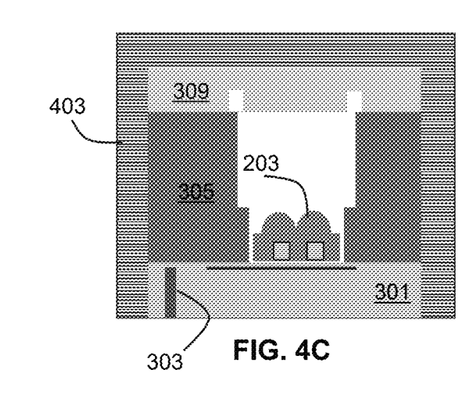
Figure 4D:
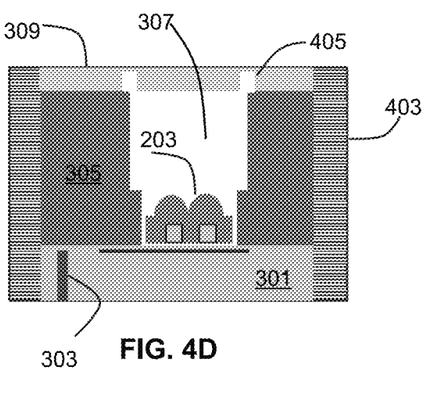
Figure 4E:
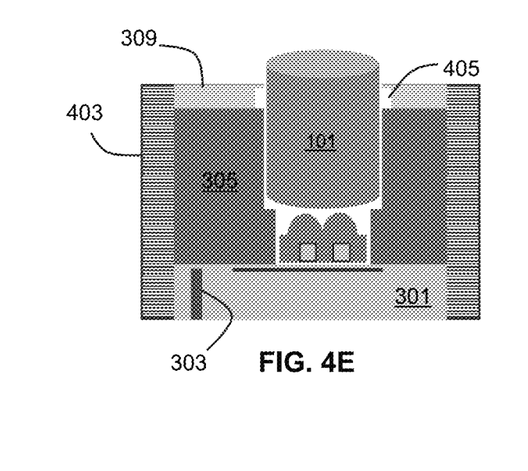

FIGS. 4A-E show a close-up view of the components in a packaging and assembly process for a parallel optical link and also implementing a molding compound around the optical transceiver die 300, and provides additional information regarding portions of some embodiments of the process of FIGS. 3G and 3H. FIGS. 4A-E show how each of the frame apertures 307 may be precisely aligned with one or more optoelectronic devices, such as microLEDs 203. Consequently, optical fibers may be placed within the frame aperture with the necessary alignment with the one or more optoelectronic devices, as shown in FIG. 4E. In some embodiments, the IC wafer 301 may be a CMOS IC. In some embodiments, optical transceiver die (including the frame/lid and solder bumps on its bottom) are encased in molding compound 403. The molding compound may be applied to the outside of the optical transceiver die after 2.5D package assembly, as shown in FIG. 4C. In some embodiments, all or part of the lid is removed from the top of the frame along with the molding compound, for instance by mechanical grinding, as shown in FIGS. 4C-D. This grinding process can also remove molding compound from the top of other die (e.g., digital logic die) that are attached to the same interposer as the optical transceiver die, and may also thin those other die. This is helpful for subsequent attachment of a heat sink to those other die.

In some embodiments, the lid 309 comprises some mechanically weaker sections that are designed to break when sufficient pressure is applied such that breaking these weaker sections allows the lid to be removed above the frame cavities. When the lid is partially removed, the lid may have one or more bridges 405 near the aperture of the frame to allow the optical fiber 101 to be placed in between and align with the one or more optoelectronic devices.

Figure 5:
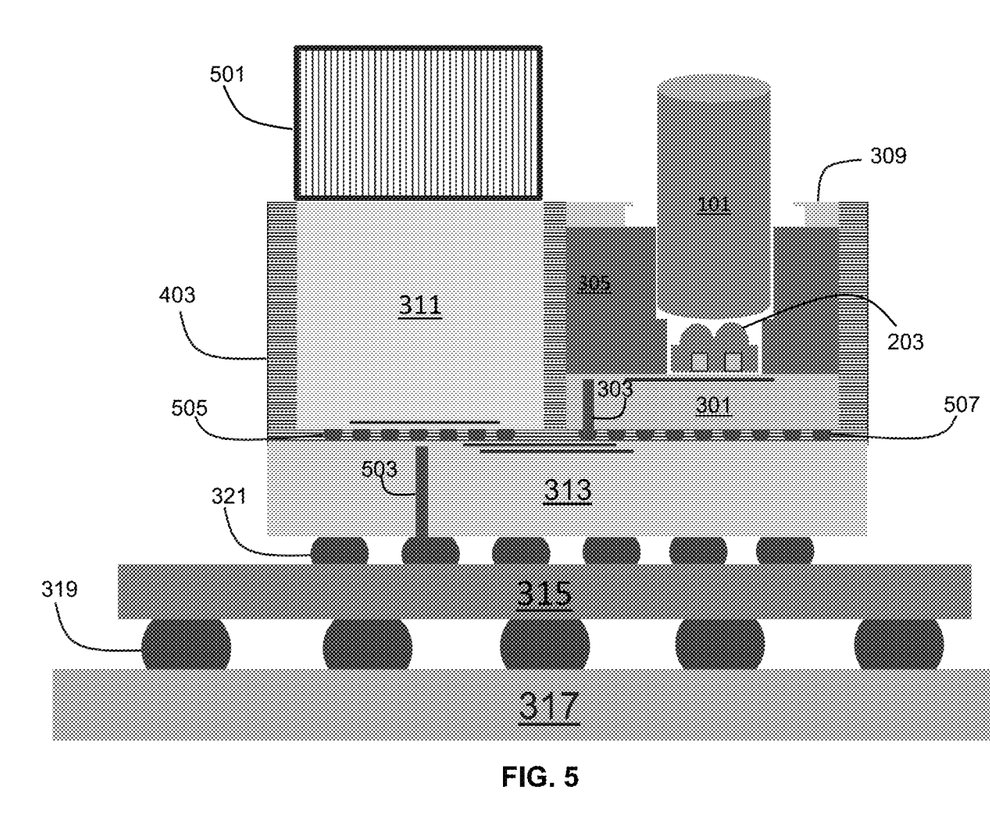
FIG. 5 is a diagram of the packaged integrated circuits having a heat sink implemented, in accordance with aspects of the invention.

FIG. 5 shows the packaged integrated circuits, such as shown in FIG. 3F, having a heat sink implemented. After removal of all or part of the lid, in some embodiments a heat sink 501 is attached to some or all ICs that are inside of the package. The heat sink may comprise cavities or slots enabling optical fibers to escape the heat sink. In some embodiments, an optical fiber 101 is then inserted into each aperture in the frame 305, where the fiber is typically a multicore optical fiber. The fiber may be held in place by adhesive, or may be held in place by some mechanical latching mechanism. As shown in FIG. 5, the silicon interposer 313 having the optical transceiver die interconnected to the digital logic die 311 may have a second set of through-silicon vias 503. The second set of through-silicon vias may, for example, electrically connect the digital logic die to the package substrate 315. The digital logic die may be attached to the interposer by a third set of solder bumps 505, and the optical transceiver die may be attached to the interposer by a fourth set of solder bumps 507.

Figure 6:
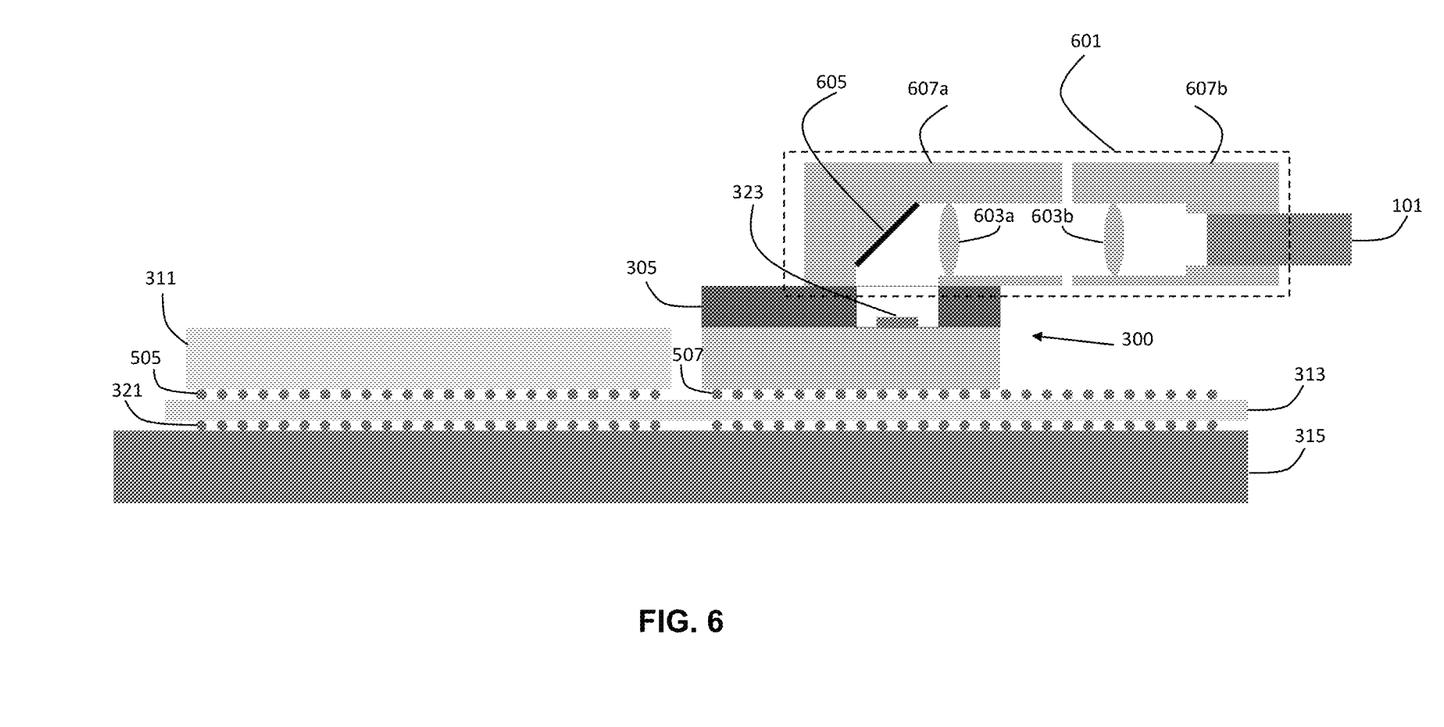
FIG. 6 is a diagram of packaged integrated circuits having an optical coupling assembly implemented with the optical transceiver die, in accordance with aspects of the invention.

FIG. 6 shows a diagram of packaged integrated circuits having an optical coupling assembly implemented with the optical transceiver die 300. In some embodiments, an optical coupling assembly 601 is attached to the top of the frame at the location of each optoelectronic device array. In some embodiments, the optical coupling assembly comprises optical elements such as lenses 603a-b and mirrors 605, plus an attached multicore optical fiber 101. In some embodiments, the optical coupling assembly comprises two or more parts 607a-b. In some embodiments, a first part 607a may comprise optical elements such as lenses and mirrors, while a second part 607b may comprise optical elements such as lenses and mirrors, and also is attached to an multicore optical fiber 101. In some embodiments, the first part 607a is attached to the frame 305 such that light couples to/from an optoelectronic device array, and the second part that comprises an multicore optical fiber is then attached to the first part such that light is coupled between the optoelectronic device array and multicore optical fiber.

Although the invention has been discussed with respect to various embodiments, it should be recognized that the invention comprises the novel and non-obvious claims supported by this disclosure.

What is claimed is:

1. A parallel optical link packaging assembly, comprising:
    an optical transceiver die having an integrated circuit wafer with a plurality of through-silicon vias connecting an optoelectronic device array attached on a top surface of the integrated circuit wafer to a bottom surface of the integrated circuit wafer, the integrated circuit wafer including transmitter circuitry and receiver circuitry;
    the optoelectronic device array having a plurality of microLEDs and a plurality of photodetectors; and
    a frame with a removable lid, the frame attached to the top surface of the integrated circuit wafer, the frame having apertures configured to align one or more optical coupling components with the optoelectronic device array and the removable lid having one or more bridges near the apertures of the frame;
    wherein the one or more optical coupling components comprise a multicore optical fiber that is insertable inside one of the apertures of the frame; and
    wherein the apertures of the frame have vertical steps configured to align the multicore optical fiber with the optoelectronic device array.

2. The parallel optical link packaging assembly of claim 1, wherein the one or more optical coupling components are configured to optically connect the optoelectronic device array with another optical transceiver die.

3. The parallel optical link packaging assembly of claim 1, wherein the optical transceiver die along with the frame and the removable lid are encased in a molding compound.

4. The parallel optical link packaging assembly of claim 1, wherein the removable lid is partially removable.

5. The parallel optical link packaging assembly of claim 4, wherein the removable lid is configured to be removed by mechanical grinding.

6. The parallel optical link packaging assembly of claim 1, wherein the optical transceiver die is attached to an interposer having a digital logic die using a 2.5D packaging process.

7. The parallel optical link packaging assembly of claim 6, wherein the interposer having the optical transceiver die and the digital logic die is attached to a package substrate using the 2.5D packaging process.

8. The parallel optical link packaging assembly of claim 7, wherein the package substrate is attached to a printed circuit board.

9. The parallel optical link packaging assembly of claim 1, further comprising a heat sink.

10. A method of manufacturing a parallel optical link packaging assembly, comprising:
    providing an integrated circuit wafer;
    fabricating through-silicon vias in the integrated circuit wafer, the through-silicon vias connecting a top surface of the integrated circuit wafer to a bottom surface of said integrated circuit wafer;
    attaching an optoelectronic device array on the top surface of the integrated circuit wafer, said optoelectronic device array having a plurality of microLEDs and a plurality of photodetectors;
    attaching a frame with a removable lid on the top surface of the integrated circuit wafer, the frame having apertures configured to align one or more optical coupling components with the optoelectronic device array and the removable lid having one or more bridges near the apertures of the frame;
    encasing the parallel optical link packaging assembly in a molding compound; and
    at least partially removing, by mechanical grinding, the removable lid and a portion of the molding compound on the removable lid.

11. The method of claim 10, wherein the one or more optical coupling components comprise a multicore optical fiber that is inserted inside one of the apertures of the frame.

12. The method of claim 11, wherein the apertures of the frame have vertical steps that align the multicore optical fiber with the optoelectronic device array.

* * * * *